US011263688B2

(12) United States Patent
Broome

(10) Patent No.: US 11,263,688 B2
(45) Date of Patent: Mar. 1, 2022

(54) SHOPPING METHOD AND SYSTEM FOR COMPILING A REVISED USER LIST ON A PORTABLE USER DEVICE USING A STORE LIST DOWNLOADED FROM A REMOTE DATABASE TO THE PORTABLE USER DEVICE

(71) Applicant: UBAMARKET LTD, London (GB)

(72) Inventor: William Broome, London (GB)

(73) Assignee: UBAMARKET LTD, London (GB)

( * ) Notice: Subject to any disclaimer, the term of this patent is extended or adjusted under 35 U.S.C. 154(b) by 420 days.

(21) Appl. No.: 16/093,378

(22) PCT Filed: Apr. 18, 2017

(86) PCT No.: PCT/GB2017/051074
§ 371 (c)(1),
(2) Date: Oct. 12, 2018

(87) PCT Pub. No.: WO2017/178843
PCT Pub. Date: Oct. 19, 2017

(65) Prior Publication Data
US 2019/0139121 A1    May 9, 2019

(30) Foreign Application Priority Data
Apr. 15, 2016    (GB) ..................... 1606615

(51) Int. Cl.
*G06Q 30/06*    (2012.01)
*G06K 7/14*    (2006.01)
*G06Q 30/02*    (2012.01)

(52) U.S. Cl.
CPC ....... *G06Q 30/0633* (2013.01); *G06K 7/1413* (2013.01); *G06Q 30/02* (2013.01)

(58) Field of Classification Search
CPC ............... G06K 7/1413; G06Q 30/02; G06Q 30/06–0645; G06Q 30/08; G06Q 50/01
See application file for complete search history.

(56) References Cited

U.S. PATENT DOCUMENTS 7,376,591 B2 *  5/2008  Owens ................... G06Q 30/02
                                                              705/14.4
7,689,473 B2 *  3/2010  Borom .................... G06Q 30/02
                                                              705/26.1
(Continued)

FOREIGN PATENT DOCUMENTS

WO    WO-2012044864 A2 *  4/2012  ............. G06Q 30/06

OTHER PUBLICATIONS

Henry, "GroceryIQ Organizes Your List, Makes Shopping Easier," PC Magazine Online, Ziff Davis, Inc.; Aug. 17, 2010 (Year: 2010).*
(Continued)

*Primary Examiner* — Adam L Levine
(74) *Attorney, Agent, or Firm* — McDonnell Boehnen Hulbert & Berghoff LLP

(57) ABSTRACT

A computer-implemented method of optimising an electronic shopping list is disclosed. The method comprises receiving, at a user equipment, a user list of products; receiving, at a user equipment, a store list of available products, each available product characterised by at least one variable; compiling a revised list from the user list and the store list, comprising associating each product from the user list with one or more available products and arranging an order of the revised list depending upon the at least one variable; and presenting the revised list using the user equipment.

20 Claims, 6 Drawing Sheets

(56) References Cited

U.S. PATENT DOCUMENTS

| | | | |
|---|---|---|---|
| 7,797,204 B2* | 9/2010 | Balent | G06Q 10/087 |
| | | | 705/28 |
| 9,886,713 B2* | 2/2018 | Borom | G06Q 30/0601 |
| 2004/0128210 A1* | 7/2004 | Gabos | G06Q 30/0267 |
| | | | 705/26.8 |
| 2010/0070365 A1 | 3/2010 | Siotia et al. | |
| 2012/0253828 A1 | 10/2012 | Bellacicco | |
| 2012/0303480 A1* | 11/2012 | Stone | G06Q 30/00 |
| | | | 705/26.8 |
| 2014/0172621 A1 | 6/2014 | Vittolia | |
| 2015/0120475 A1 | 4/2015 | Pedley et al. | |
| 2015/0120745 A1 | 4/2015 | Pedley et al. | |
| 2015/0228004 A1* | 8/2015 | Bednarek | G06Q 10/08355 |
| | | | 705/26.8 |

OTHER PUBLICATIONS

International Search Report and Written Opinion for International Patent Application PCT/GB2017/051074, dated May 19, 2017.
International Search Report dated May 31, 2017 for International Application No. PCT/GB2017/051074, 3 pages.

* cited by examiner

SHOPPING METHOD AND SYSTEM FOR COMPILING A REVISED USER LIST ON A PORTABLE USER DEVICE USING A STORE LIST DOWNLOADED FROM A REMOTE DATABASE TO THE PORTABLE USER DEVICE

CROSS-REFERENCE TO RELATED APPLICATIONS

This application is a U.S. National Stage application under 35 U.S.C. 371 of International Patent Application no. PCT/GB2017/051074, filed Apr. 18, 2017, which claims the benefit of priority of U.K. Patent Application no. 1606615.1, filed Apr. 15, 2016.

FIELD

This disclosure relates to a store shopping method and system, and in particular, though not limited to, a method and system for store shopping in which a user list of products is optimized, comprising compiled into a revised list using a list of available products in the store and a characteristic of each available store product. The disclosure also extends to a computer readable storage device; a computer program product; and a user equipment for use in store shopping; and to a method of payment.

BACKGROUND

Despite being a regular necessity for many, shopping in a physical store (which can be one or more shops, retail outlets, or in-store access to online, say) can be a frustrating and time consuming process. In particular, as the size of supermarkets, say, and the number of items ("products"; goods and/or services) that they offer for sale has grown, the time taken to find items to buy on a shopping list in such supermarkets has increased. The frustration this causes is compounded at the checkout when the shopper's items must be unpacked on to a conveyer belt to be scanned before being repacked and paid for.

There have been several approaches to assist shoppers and retailers alike. One approach has been to provide shoppers with handheld scanners so that they can scan items themselves as they shop. At the end of the shop, details of the scanned items are transferred from the scanner to the checkout system for payment by the shopper. This mitigates the need to unpack the items at the checkout because the items have already been scanned. However this doesn't assist shoppers with finding items on their shopping list in the shop, or assist shoppers to easily take advantage of promotions and loyalty cards, for instance.

Another approach has been to provide shoppers with an interface to generate a shopping list, prior to shopping, from a list of items in the shop; rather like online shopping. Unsatisfactorily, this approach requires a high level of user input in searching, and this takes time and is technically a burden to the user both in terms of complexity, time and resources—undermining the simplicity and speed of a traditional free form text shopping list.

A further suggestion has been to send shoppers a list from a store database and leave shoppers to search the list. This has proved an unwanted burden on the store's IT infrastructure, and has still required users to make time consuming choices from multiple options.

Not only have previous approaches therefore proved unsatisfactory for shoppers in terms of the technical difficulties described above, but they have also proved unsatisfactory for retailers. The optimisation of the shopping list, and data management have been unsatisfactory in terms of resource, time, and complexity; and it has been difficult to keep data up to date in real time. Previous approaches have not been helpful in improving the shopper's experience in terms of being simpler; and minimising time, resource and input burden, and have failed also to mitigate the risk of shop lifting, for example. Neither have previous approaches been readily compatible with existing supermarket infrastructure, such as existing point of sale (POS) systems. It has also proved difficult with previous approaches to successfully manage data flow to encourage loyalty card use and/or contribute to the collection of consumer data on shopper habits and tendencies. Neither does it enable users to archive, use and revise and retrieve their shopping history, spend and savings, for example; as well as electronic receipts The present disclosure aims to address some of these problems.

SUMMARY

The present invention is set out in the independent claims, with some optional features set out in the claims dependent thereto.

According to the present disclosure there is presented a computer-implemented method of store shopping, comprising receiving, at a user equipment, a user list of products; receiving, at a user equipment, a store list of available products, each available product characterised by at least one variable; compiling a revised list from the user list and the store list, comprising associating each product from the user list with one or more available products and arranging an order of the revised list depending upon the at least one variable; and presenting the revised list using the user equipment. The approach advantageously allows for multiple similar items of the same genre to scan as the same generic term—i.e. milk will work for all milk related products, as will their more specific descriptive name; so the approach is possible for input that is completely generic or highly specific.

The store shopping method (system etc.) is in some examples an optimisation of shopping transactions, shopping aid, monitoring of use; or list generator. It may also be a framework for generation of a personal list item, for providing recommendations, for management of data. The disclosure relates to a method for optimising an electronic shopping list.

The present approach has the advantage that it is easy to use for the consumer, and minimises interactions required from the consumer to complete the shopping process. The method facilities a quicker more efficient shopping experience since the method pushes shopping list matches to the user, and also presents them in an optimum format and order. The resource burden for the user and store is also minimised; since data flow is optimised in a simple yet efficient way. Uploading the store list to the app is counterintuitive, and yet enables the user and store to reap the benefits discussed here. Also, since the user can use their own shopping list which is then automatically matched up to the store's availability, the user retains control of their purchases, dynamically in real time. The method also facilitates real time updating of the list of items to be purchased. Whilst the method is applicable to a single supermarket say, the "store" can be a group of shopping places (real and/or on line in one example) that the user wishes to complete their shopping in;

making this process quicker and more efficient. The items/products can be any goods or service, even those procured from the internet. Shop owners benefit from a system which can take into account stock levels and items they wish to promote. Furthermore, consumers benefit from a system via which they can create and manage their shopping list using specific, generic, or even bespoke terminology, to suit their requirements.

Also, the present approach has significant advantages for the store in that the backend systems can receive, from the app, real time information on the shopping of the user; enabling the store to make real time offers/stock updates etc., so there is a real-time updating. This may be done by the user being associated with a unique ID that is shared with the store.

The computer-implemented method of store shopping in one approach is a computer-implemented method of optimising an electronic shopping list. The electronic shopping list may be the user list of products.

Preferably the variable is a location of the product in the store, and/or a time at which the each product is added to the user list. This has the advantage of allowing the user to progress through the store by the quickest possible route; and to the items of most interest/immediacy first.

Preferably when the variable is a location of the product, the order is the shortest route around the store to reach all the products on the revised list. Alternatively, or additionally, the order can be the most efficient route around the store to reach all of the products on the revised list. This allows the user to complete their shopping in the quickest possible time. Alternatively, or additionally, the order can be the route around the store which the store manager or owner wishes the user to take.

Preferably, compiling the revised list comprises associating at least one of the products from the user list with more than one available product; selection by the user of one or more of the more than one available product; in which the revised list includes the user selection. This gives greater control and flexibility to the user, and also allows the store to push products as they wish for promotion or, say, price reasons.

Preferably the method further includes updating the order of the revised list dependent upon the at least one variable. Thus advantageously, the user can chose to update a list as they shop. Perhaps the user has gone off to look at another possible purchase, but the method enables them to replot a best route to take going forward; or to add in one or more items as they see or want for purchase. In another example, the user may disrupt the order of the revised list by scanning one or more items on the list in a different order to that shown on the list; so there is improved management and manipulation of the data. In this case, the one or more items are removed from the updated list and the order of the revised list is updated dependent upon the at least one variable. In this way, the user can 'disrupt' the revised list as they wish and the revised list will dynamically update. This provides the user with flexibility and avoids confusion as they shop.

The variable may be entered and/or selected by the user. It may also be chosen by the app itself running on the mobile device held by the shopper.

A product in the user list of products may be defined using a common name for the product. The common name may be indicative of the product category. The common name may be indicative of the product sub-category.

Each of the available products in the store list of available products may be characterised by at least one of a product category; a product sub-category; or a specific product available in the store.

The method may further include scanning—this is a quick and efficient way to log items. Alternative methods for logging the items for purchase may be used, such as entering bar codes manually or by photograph.

The method further comprises, when the product has had a bar code scanned, removing the product from the updated list. The user is thus kept up to date with what shopping remains, resource efficiently.

Preferably, the method includes alerting/notifying the user if a barcode of a product in the updated list has not been scanned within a time period or by a threshold time; and/or when the user indicates shopping is complete. This helps the user recall items they meant to buy but may have forgotten. In another example, an item on the updated list has to be scanned or swiped, say, to remove it from that list; which advantageously adds another layer of improved security. In particular, this is a useful security feature as it mitigates one of the most common forms of 'self-checkout' style theft in which thieves object that they thought a stolen item had scanned.

The method may further comprise compiling a checkout list of products whose bar codes have been scanned. This enables the user to keep an eye on costs, say.

Preferably the method further includes scanning a barcode at a point of sale, POS, terminal; and transmitting information relating to the checkout list to a server as well as information related to the barcode. The barcode may be a QR code.

Preferably the method further includes retrieving information from the server related to the checkout list; utilising the information for payment by the user of products on the checkout list. This backend loading approach means there is no onus on the user to register with the POS pre-purchase, and also makes the purchase operation as swift, up to date and as accurate as possible.

Preferably the method further includes revising the products included in the checkout list by comparing the products to one or more predetermined criteria. This enhances the management of the items to be purchased. The predetermined criteria can be a cost, a time, and route; or a value relating to the product itself, say.

Revising the items may comprise checking each item against an age restriction for that items; and/or price change for that product. Other comparisons and adjustments can advantageously be made, whether user or store driven.

The method may further include the step of purchasing a product using the user equipment.

The step of purchasing a product using the user equipment may comprise: inputting, to the user equipment, information identifying a product to be purchased; transmitting, to a server, from the user equipment, data indicative of the product to be purchased; transmitting, to a payment system, from the server, data indicative of the product to be purchased; and processing, at the payment system, the purchase of the product.

Alternatively, or additionally, the step of purchasing a product using the user equipment may comprise: inputting, to the user equipment, information identifying the product to be purchased; transmitting, to a server, from the user equipment, data indicative of the product to be purchased; transmitting, to a payment system, from the server, data indicative of the product to be purchased; and processing, at the payment system, the purchase of the product.

The product to be purchased may be a product comprised in the revised list.

According to the present disclosure there is further presented a user equipment for shopping in a store, comprising at least one processor and instructions accessible on a computer readable storage system, the instructions causing the processor to perform operations comprising receiving a user list of products; receiving a store list of available products, each available product characterised by at least one variable; compiling a revised list from the user list and the store list, comprising associating each product from the user list with one or more available products and arranging an order of the revised list depending upon the at least one variable; and presenting the revised list. The user equipment may have one or more processors running an application (or "app") which resides on the user's mobile phone ("user equipment"). The shopping process is thus optimally efficient and requires minimal user interaction and resource consumption.

Preferably the variable is a location of the product in the store, and/or a time at which the each product is added to the user list.

Preferably the variable is a location of the product, the order is the shortest route around the store to reach some or all the products on the revised list. This enables the user to have a quick transit through the store.

Preferably compiling the revised list comprises associating at least one of the products from the user list with more than one available product; selection by the user of one or more of the more than one available product; in which the revised list includes the user selection.

Preferably the operations further include updating the order of the revised list dependent upon the at least one variable. The variable may be entered and/or selected by the user. Preferably the operations further include scanning a bar code of one or more products from the revised list using the user equipment. This is a quick approach for the user and minimises the risk of theft. The bar code of the one or more products may be scanned in an order which is different to the order of the one or more products in the revised list.

Preferably the operations further include, when the product has had a bar code scanned, removing the product from the updated list.

Preferably the operations further include alerting the user if a barcode of a product in the updated list has not been scanned within a time period; and/or when the user indicates shopping is complete. Preferably the operations further include compiling a checkout list of products whose barcodes have been scanned. This can be done by transferring removed items from the updated list.

Preferably the operations further include scanning a barcode (or QR code) at a point of sale, POS, terminal/system; transmitting the checkout list to a server and information related to the barcode. The list may be transmitted to a computer, database or the like; in store or remote.

Preferably the operations further include retrieving information from the server related to the checkout list; utilising the information for payment by the user of products on the checkout list.

Preferably the operations further include revising the products included in the checkout list by comparing the products to one or more predetermined criteria. Revising the products may comprise checking each product against an age restriction for that products; and/or price change for that product.

The present disclosure further relates to a store shopping system, comprising a user equipment as described herein; a database comprising a store list of available products, each available product characterised by at least one variable; in which the user equipment is arranged to receive the store list from the database.

The present disclosure further relates to a computer readable storage device having embedded therein a set of instructions which, when executed by one or more processors of a computer, cause the computer to execute operations comprising the method described herein.

The present disclosure further relates to a computer program product carrying a machine readable medium storing instructions which, when executed by a user equipment comprising at least one processor, cause the user equipment to execute operations comprising the method described herein.

The present disclosure further relates to a method of purchasing a product using a user equipment, the method comprising: inputting to the user equipment information identifying a point of sale, POS; transmitting to a server, from the user equipment, data indicative of a product to be purchased and data associated with the POS; receiving, at the POS, data relating to the product; and processing, at the POS, the purchase of the product. Unlike suggested approaches, there is no scanning of a code required to import a list of products to the mobile. The POS can easily obtain what information is required from the server without the user's mobile being required further, minimising resource consumption and information flow. The POS may be a terminal or system, say. Preferably, in one approach, each time the app is activated a, for example, small period of time (say, 3 second) update will ensure the product list, locations and all prices are up to date.

Preferably, data indicative of at least one of the product to be purchased; a shopping list of the user; the amount paid by the user for the at least one product; the user's loyalty scheme details; the time the user has spent in store; the route the user has taken around the store; and a receipt of the purchase of the product is stored on the server. The data may be searchable and accessible by the server owner; the store manager and/or owner; the POS; the user; or any party given permission by a party with authority to search and access the server; so there is improved data manipulation and management.

Preferably the method further comprises inputting, at the handheld device, a unique identifier for the POS. The step of inputting may comprise scanning, by the user equipment, a unique identifier for the POS. Scanning offers a quick an easy method to the user.

The unique identifier may be a quick response code. Other identifiers can be used.

Preferably the method further comprises the step of generating a unique identifier for the purchase. Processing, at the POS, the purchase of the at least one product may further comprise taking payment for the purchase of the at least one product.

Preferably the method further comprises the step of sending and optionally displaying, to a user of the handheld device, an acknowledgement of the purchase. The acknowledgement may be an e-receipt. Alternatively, an acknowledgement may be printed, or sent electronically (by e-mail, for instance). The acknowledgement and/or the full shopping history of the user may be stored on the server and/or locally in a memory of the handheld device. The acknowledgement and/or full shopping history may comprise details on the at least one product purchased. The details may include a name of the product; a description of the product; a weight of the product; or a location of the product. The information may be stored in greater detail than the original shopping list. The present disclosure further relates to a computer-implemented method of store shopping, comprising receiving, at a user equipment, a user list of products; receiving, at the user equipment, an indication of a trigger variable; receiving, at the user equipment, a store list of available products, the store list comprising, for each available product, an associated set of variables; compiling a revised list from the user list and the store list, comprising associating each product from the user list with one or more available products and arranging an order of the revised list depending upon at least one of the set of variables; presenting the revised list using the user equipment: comprising, when one of the sets of variables includes the trigger variable; providing an alert indicating each product from the revised list which is associated with the trigger variable.

The present approach has the advantage that it is easy and efficient to use for the consumer, and it makes the shopping process more efficient by alerting the consumer if items on their shopping list are associated with a certain trigger variable which is personal to the user. This increases the consumer's awareness of the various characteristics of the products on their shopping list without placing undue burden on the consumer or their resources. The alert can be any way of notifying a user, such as a visual, audio or electronic signal; such as the item in question changing colour on the revised list. The trigger variable can be any characteristic, including nutritional value such as wheat or gluten inclusion, maximum fat content, nut inclusion etc.

The approach is therefore flexible and easy to use for the consumer as the consumer can make spontaneous purchase decisions. This is useful for retailers as it means that the consumer is encouraged to take advantage of offers in the store.

Preferably the method further comprises the step of scanning, by the user equipment, a barcode of an available product. Or the scanning (or other means of input) can be of any product ID. The barcode may be on the product. Alternatively, or additionally, the barcode may be reproduced on a surface remote from, or proximate to, the product. The barcode may be any type of barcode. By way of example only, the barcode may be a static price barcode, a variable weight barcode, a price override barcode, a greetings card code, a newspaper code. Advantageously, the ability of the user equipment to scan all manner of barcodes means that the user equipment is more capable than a typical POS scanner, which may not have the ability to scan all manner of barcodes. Usefully, this means that the amount of data needed to be manually entered—for example, by keyboard or touch screen—to complete a shopping transaction is reduced. Overall, this reduces battery, memory usage and processing burden on the POS and user equipment.

Preferably the method further comprises, when the barcode includes the trigger variable, providing an alert, using the user equipment, that the available product is associated with the trigger variable.

The trigger variable may be related to a nutritional characteristic of a product from the user or store list of products.

The trigger variable can be an allergen, ingredient such as sugar or e-numbers, nutritional information such as calories, price threshold, quantity of a given ingredient or the like. The trigger variable can refer to a variable and a threshold amount. There may be more than one trigger variable.

The present disclosure further relates to a user equipment, the user equipment comprising at least one processor and instructions accessible on a computer readable storage system, the instructions causing the processor to perform operations comprising receiving a user list of products; receiving an indication of a trigger variable; receiving a store list of available products, each available product characterised by an associated set of variables; compiling a revised list from the user list and the store list, comprising associating each product from the user list with one or more available products and arranging an order of the revised list depending upon at least one of the set of variables; and presenting the revised list comprising, when one of the sets of variables includes the trigger variable; providing an alert indicating each product which is associated with the trigger variable; wherein the store shopping system further comprises: a database comprising a store list of available products, each available product characterised by an associated set of variables; in which the user equipment is arranged to: receive the store list from the database.

The present approach has the advantage that a copy of the store list is received locally on the user device, meaning that the user equipment does not need to query the database each time the user amends the user list of products. This reduces the number of exchanges that must occur between the user equipment and the database; where relevant this reduces bandwidth usage and/or reduces the burden on the battery of the user equipment. A further advantage is that, because the store list is received locally, the user can carry out their shop without connection to a communications network, such as the internet. For example, a Wi-Fi connection is not required during the shopping activity. Again, this improves the user's interaction and experience, since the burden on the user is minimised and, as well as use of resources, there is improved management of the data.

This makes the shopping experience more efficient for the user as they do not need to manually verify whether or not each of the products is associated with the trigger variable. The alert may be any combination of an alarm sounded on the user equipment, a vibration of the user equipment, a colour change on a screen of the device, or the like.

The trigger variable may be related to a nutritional characteristic of a product from the user or store list of products.

It may be that each of the variables in the set of variables is stored as a field in the database. The user equipment may additionally be arranged to scan a barcode of an available product. This means that a variable for a particular product can be easily found, referenced and/or updated in the database as is necessary by filtering out unhelpful fields in the database.

Preferably when the barcode includes the trigger variable, the user equipment is additionally arranged to provide an alert that the available product is associated with the trigger variable.

This makes the shopping experience more efficient for the user as they do not need to manually verify whether or not each of the products is associated with the trigger variable. The alert may be any combination of an alarm sounded on the user equipment, a vibration of the user equipment, a colour change on a screen of the device, or the like.

The present disclosure further relates to a store shopping system, comprising a user equipment as described above; a database comprising the store list of available products, each available product characterised by at least one variable; in which the user equipment is arranged to receive the store list from the database. The database can be any computing system.

The present disclosure further relates to a computer readable storage device having embedded therein a set of instructions which, when executed by one or more processors of a computer, cause the computer to execute operations comprising the method as described above.

The present disclosure further relates to a computer program product carrying a machine readable medium storing instructions which, when executed by a user equipment comprising at least one processor, cause the user equipment to execute operations comprising the method as described above.

Advantageously, this means that the consumer will still receive an alert that a product is associated with their trigger variable despite the product not being in the user list of products. The system is therefore flexible and can support the consumer as they make spontaneous, live decisions in real time.

The present disclosure further relates to a method of purchasing a product using a user equipment, the method comprising: inputting, to the user equipment, information identifying a product to be purchased; transmitting, to a server, from the user equipment, data indicative of the product to be purchased; transmitting, to a payment system, from the server, data indicative of the product to be purchased; and processing, at the payment system, the purchase of the product; alone or in combination with other examples described herein.

Preferably, the data indicative of the product to be purchased may comprise the price of the product to be purchased.

Preferably, the payment system may be a third party payment system. Preferably, the payment system may be hosted on a server.

Preferably, the method may further comprise the step of transmitting, from the server, to a supermarket point of sale, POS, and back office, data indicative of the product to be purchased. The method may further comprise the step of confirming, at the supermarket POS and back office if the price of the product to be purchased is correct. The method may further comprise the step of sending, to the server, from the supermarket POS and back office, a message confirming that the price of the product to be purchased is correct.

Preferably, the step of inputting, to the user equipment, information identifying a product to be purchased may comprise the user scanning, using the user device, a bar code of the product and selecting a check out or pay option on the user device.

Preferably, the method may further comprise the step of sending, from the payment system, to the server, confirmation that the payment has been processed. The method may further comprise the step of sending, from the server, to the user device, confirmation that the payment has been processed. The method may further comprise the step of displaying to, or alerting the user, of the handheld device, confirmation that the payment has been processed.

BRIEF DESCRIPTION OF THE DRAWINGS

Specific embodiments in which the invention is embodied are described below by way of example only and with reference to the accompanying drawings, in which.

OVERVIEW

Figure 1:
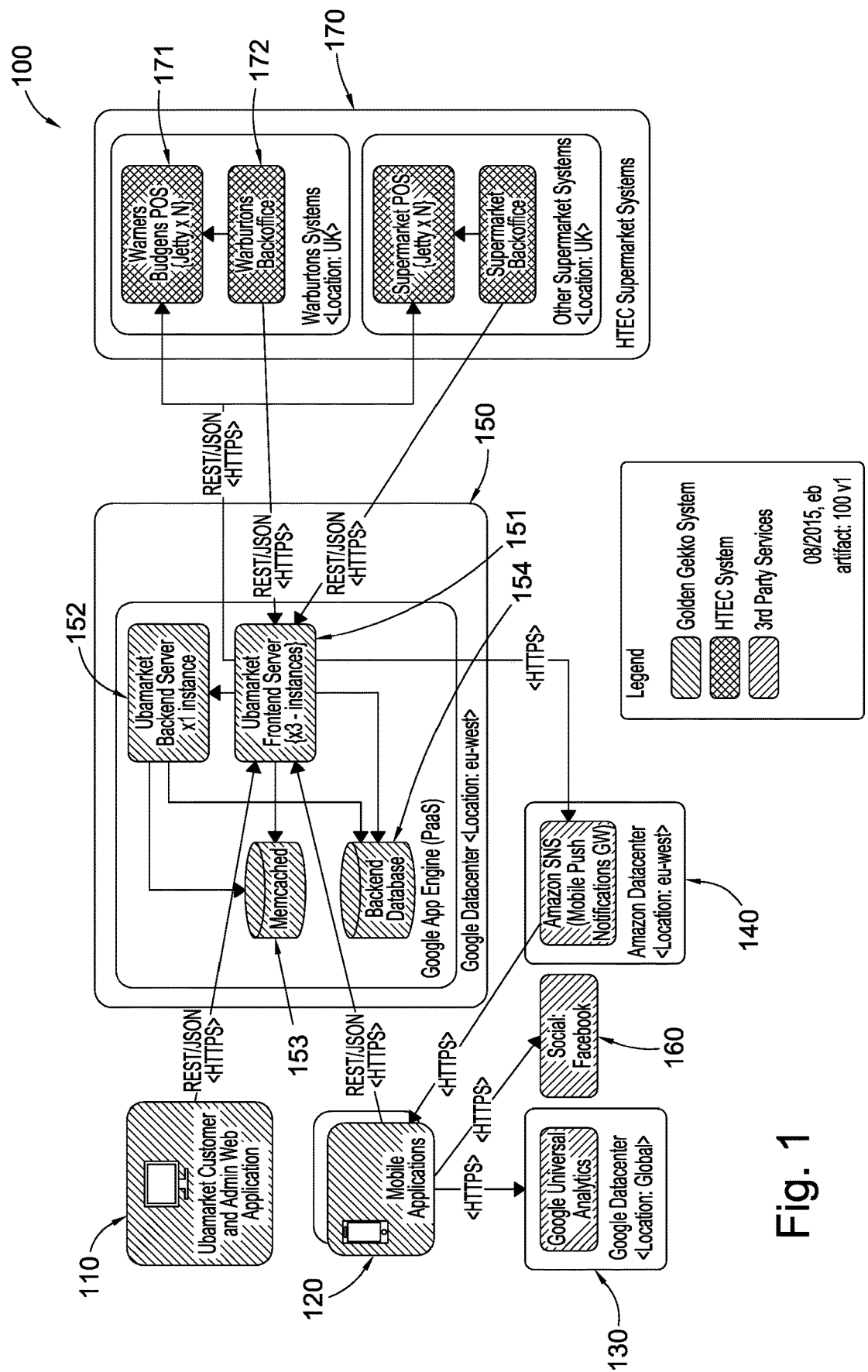
FIG. 1 is a system architecture according to one aspect of the present disclosure.

The method described here allows a user, using an app on a mobile; to receive an optimized shopping list of items derived from items (product; goods/service) they wish to purchase. The revised, or "optimized", list not only includes items actually available in store, but in a sequence optimized for shopping within that store; or according to a desired criteria.

The list of user desired items can come from a user entering the items into the mobile phone app manually, by importing from text notes, by scanning a photo, from downloading a shopping history etc. A list of available store products and associated attributes such as location in store, is uploaded to the mobile device, and used to automatically present in the app a list of corresponding store products, but also, as soon as a user desires (say, hits a "shop" button, or the like), a list in an order based on, for example, location in the store. In one example, the list is provided in an order based on location as default, although other defaults are possible. In this example, items are presented one at a time for ease of shopping, although more than one item can be presented. The location is indicated next to the item. The app can then guide the user to the items by their location. As the user picks up items to purchase, the user scans the item barcode on the product or on the shelf using their mobile device. The barcode can be on at least one of the item; a surface proximate the item, such as a shelf; or a surface remote from the item, such as a poster, for example. Any other items in store with a barcode can also be scanned by the mobile/mobile app for purchase.

Advantageously, barcode scanning provides real time prices and product descriptions via the store's own application programming interface (API). As a result, each product therefore always scans at the correct, real-time price; so there is efficient, dynamic and real-time updating of data with minimal demand on resources. Further advantageously, the user will be notified if a scanned product is withdrawn while the user is shopping. A product may be withdrawn for safety reasons, for example. If an item is withdrawn, the user will not be able to complete their payment transaction until the withdrawn item is removed from their shopping list and/or checked out list. This is an important fail safe feature in case a product is suddenly withdrawn for safety reasons.

On reaching the point of sale (POS), the user scans a barcode at the POS and the details of the purchased items (and POS) are sent to a computing device or database, say a server. An operator at the POS retrieves the purchases from the server. The barcodes are presented as a list obviating the need for scanning at the POS.

If the user has a loyalty card, details are sent with the purchase details allowing the POS to add loyalty to the transaction as if a loyalty card had been presented. Thus, advantageously, there is "automatic loyalty" using this example.

Additionally, or alternatively, if the user has a voucher, details of the voucher may be sent with the purchase details allowing the POS to redeem the value of the voucher against the transaction. The voucher may be at least one of a monetary amount to be redeemed against the value of the transaction; a monetary amount to be redeemed against the value of a particularly product to be purchased; associated with a loyalty card of the user. For example, the coupon may entitle the user to a certain number or factor of extra loyalty card points. The user may input details of the voucher to the user device in any of the previously described ways, including scanning a barcode on the voucher. The voucher may not be a paper voucher, but may be an electronic voucher. In this way, shoppers can redeem loyalty points and scan vouchers for offers in real time to discount their current shopping list.

DETAILED DESCRIPTION OF THE DRAWINGS

FIG. 1 shows a system architecture 100. The system architecture 100 has a supermarket system 170, a datacentre 150, a mobile application 120, a customer and administrative application 110, a datacentre 130, a datacentre 140 and a social media 160. Each of these will now be described in turn.

The supermarket system 170 has a supermarket point of sale (POS) 171 and a supermarket backoffice 172. The supermarket POS 171 and the supermarket backoffice 172 are communicably linked, here wirelessly. The supermarket POS is a point of sale at a supermarket. The point of sale is an assisted point of sale, or "checkout", or a non-assisted point of sale, such as a self-service checkout.

The supermarket POS system 171 and the supermarket backoffice 172 are in the same physical location. In an alternative aspect, the supermarket POS system 171 and the supermarket backoffice 172 are in different physical locations.

The datacentre 140 has a backend server 152, a frontend server 151, a memory 153 and a backend database 154. Memory 153 is an in-memory cache or RAM used to increase performance (decrease latency) of requests for data by the apps. Each of the backend server 152, frontend server 151 and memory 153 are communicably coupled with each of the other of the backend server 152, frontend server 151 and memory 153. The backend server 152 and the frontend server 153 are responsible for aggregating information. The backend server 152 and the frontend server 153 are responsible for aggregating product information from the supermarket system 170. The backend server 152 and the frontend server 153 aggregate end user information from the mobile application 120, or "app" 120. The backend database 154 contains product information and system end user data. The memory 153 is a random access memory. The memory 153 may be an in-memory cache. The memory 153 may receive requests for data from either of the frontend server 151 or the backend server 152. The requests can originate from the app 120.

The customer and administrative web application 110 is communicably coupled with the frontend server 151. The customer and administrative web application 110 is provided as a single web-page style application for managing either or both of the datacentre 150 features and end user features.

The app 120 itself is downloaded to the mobile device (not shown). The app 120 may be compatible with both or one of an iOS operating system or an Android operating system. The mobile running app 120 is communicably coupled with the frontend server 151, datacentre 140, datacentre 130 and the social media 160.

The datacentre 130 has analytics (such as Google Universal Analytics, and/or others not shown) for collecting and aggregating usage information from the app 120. The datacentre 130 is communicably coupled with the app 120.

The social media 160 is one or more social media websites or social media mobile applications. The social media 160 may be communicably coupled with the mobile application 120.

The datacentre 140 provides push notification support. The datacentre 140 is communicably coupled with the mobile application 140 and the front end server 151. The push notification support may provide a single application program interface (API) for use with both Android and iOS operating systems.

Figure 2:
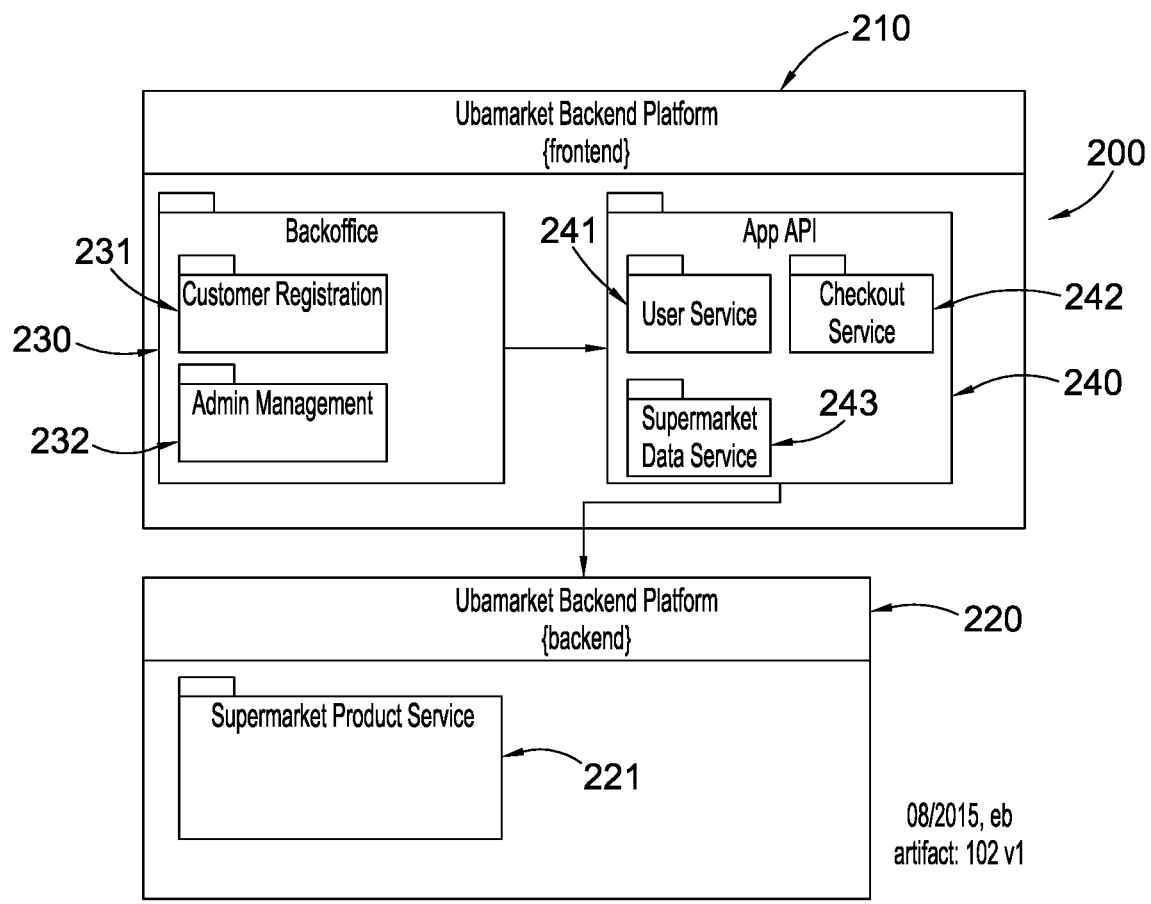
FIG. 2 is a schematic of a sub-system of the system architecture of FIG. 1.

In an alternative shown in FIG. 2, a sub-system 200 is substituted for the frontend server 151 and the backend server 152 of FIG. 1. The sub-system 200 defines a backend platform. The backend platform has a frontend 210 and a backend 220. Each of these will now be discussed in turn.

The frontend 210 has a backoffice 230 and an application API 240. The backoffice 230 has a customer registration module 231 and an administration management module 232. The customer registration module 231 is a module that manages the registration of end users with the system. The administration module 232 is a module that provides access to manage supermarkets (not shown), supermarket data (not shown), and end user management. A supermarket is any retailer or vendor (or group thereof) of a product or service to a customer. In some arrangements, the supermarket is a retailer of substantially non-grocery items, such as clothing items. The backoffice 230 is communicably coupled with the application API 240. The application API 240 has a user service module 241, a checkout service 242 and a supermarket data service 243. The user service module 241 is a module that provides an authentication mechanism for the backoffice 230, the mobile application 120 and the supermarket system 170. The supermarket data service 243 is a module that provides all of the supermarket data for the mobile application 120. The checkout service 242 is a module for interfacing between the mobile application 120 and the supermarket POS 171 for product purchases. The application API 240 is communicably coupled with the backoffice 230 and the backend 220.

The backend 220 has a supermarket product service 221. The supermarket product service 221 is a service for managing all of the supermarket product data.

Reference here to two or more entities being "communicably coupled" means that there exist one or more connections between the two entities such that the two or more entities are able to exchange data. The connection or connections may be wired or wireless. Any suitable protocol or combination of protocols may be used with the system 100 and sub-system 200. A hypertext transfer protocol (HTTP) may be used.

Structure of the Backend Database 154

In one example, a number of fields are defined in the backend database. One field relates to the name of a product in a particular supermarket. In the present example, one field relates to the location of that product in the particular supermarket and this is used in reordering of the user list. One field relates to the price of that product in the particular supermarket. The price field may also be stored in the POS. In one example, one field included relates to a common name associated with that product. The common name is created and indicative of the generic type of product and is not a unique identified of that product. For example, the common name may be 'milk' where that product is a bottle of milk. In another example, the common name may be 'bread' where that product is a loaf of broad.

Method

Shopping List Entry by the User

Figure 3:
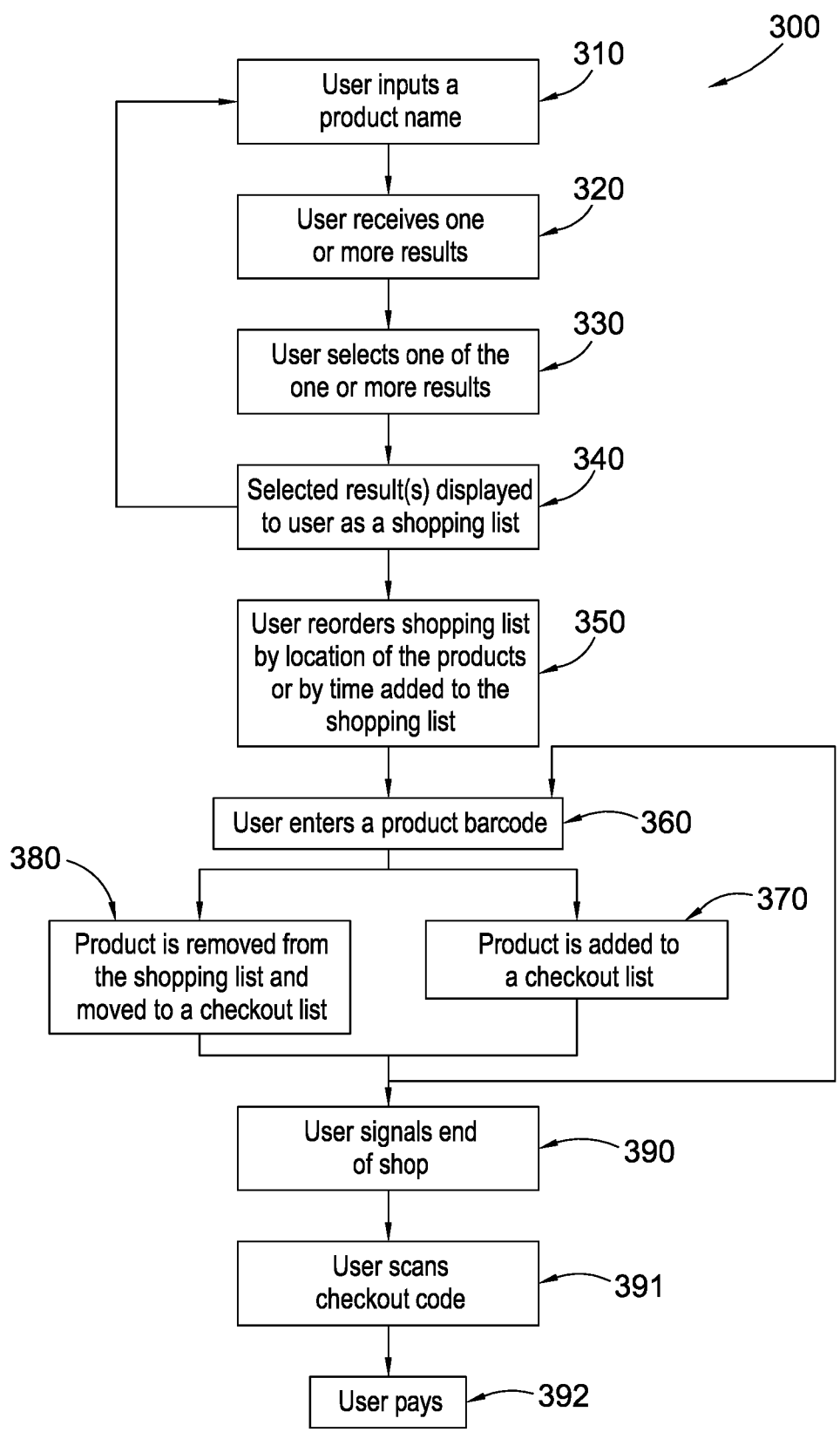
FIG. 3 is a flow diagram of a method of store shopping used with the system architectures of either FIG. 1 or FIG. 2.

FIG. 3 shows a flow-diagram for a method 300 for store shopping. The method 300 may be used with either or both of the system architectures of FIG. 1 or FIG. 2. Each of the steps of the method will now be described in turn.

At step 310 the end user of the system 100 inputs a product (goods and/or services) they wish to purchase into an app they have downloaded onto, and launched, on their a device, here a mobile phone. The mobile, or "handheld device" has a memory and a processor. The memory and processor are suitable for downloading, storing and running the mobile application 120. Any wired or wireless device such as a tablet, laptop, or other user equipment, typically portable, that may have a user interface is used in other examples. The user interface is a touch screen in this example; but can be other forms of interface such as voice control functionality; a keypad; a roller ball; a mouse etc.

The input here is of a list, although in other examples, it can be a single item. Input can be carried out in part or whole before entering the store, or in one aspect, in the store itself. The entry is by way of typing in a name of the product into the app. However, in alternative approaches, other methods are used for data input of the desired list of products. For instance, the list can be entered in any way such as imported from notes on the phone to the app, scanned from a picture, or imported from a shopping history stored in the phone, optionally in the app itself. The list can also be entered by scanning a barcode of the product to be purchased.

On this example, this list is local to the mobile device and not shared with any server, or computing device.

Each entry of the list of desired products is typically an entire product name, but can be is part of a name. The entered list may include a name of a product category, such as dairy or vegetables; or product sub-category, such as milk. As the skilled person will appreciate, the more specific the user is, that is, the more descriptive the user is, the more narrow the number of products will scan. The user may be generic (milk) or highly specific (Yeo Valley 4L Organic Milk). The use of common names enables improved data manipulation.

Updating the User Shopping List

A list of products available in the store is stored in a local database, here in one of the store servers (although in other examples, storage is remote). Against each product entry is one or more attribute fields, which here is a location field noting the location of the product within the store. The mobile has access to this list of available products, and in this example, downloads the list. That is, the mobile app or mobile downloads a local copy of the store product database. In other examples, the list is accessed.

The app uses as a starting point the user desired list as input, and then updates this desired list by using the list of available products to provide the user at step 320 with an updated list, or "results list" for the user to use as their actual shopping list. Each result is a product category, a product sub-category or a specific product available in store. The product category and/or the product sub-category may be the common name described above. Use of the common name enables the efficient grouping of generic items by category; with items grouped by category always recognised by universal descriptions. Again, this leads to a more resource efficient approach that is quicker and more accurate. The results are displayed to the end user on a screen (not shown) of the handheld device.

When for a given user entry more than one available product is available, at step 330, the app in the present example pushes one generic result to the end user, with alternative variations listed below so the user is not required to make further selections but can directly proceed with their shopping. As the skilled person will understand, the more specific the user is in their description of the product to be purchased in their shopping list, the fewer the results pushed to the user.

The results item can be based on previous shopping history, say, or a most commonly bought item of that type in the store. Other factors may be used to select the item, such as desires of retailers, or manufacturers to promote items. Cost may be used to determine the result, or convenience of location in the store, or stock availability. In one example, the convenience of location in the store is the default determinant of the result.

Whilst in this example the result correlates with the desired entered list, in another example, additional items can be presented to the user in the results list. These may be items say that are on promotion, or that a user has purchased before.

In another example, the app presents more than one result and the user is prompted to select one of the one or more products using the user interface of the handheld device. The list of options can be based upon one or more factors as discussed above in relation to the single result choice, or indeed other factors. This can be done by swiping, clicking or any other form of data entry.

At step 340, presented single items and/or selected items are displayed in a final results list to the user. The list is a shopping list. In some embodiments, the user returns to step 310 and the steps of 310 to 340 are repeated so that a plurality of products are displayed to the user at step 340. As described above, the user may manage the shopping list by swiping, clicking, tapping or any other form of data entry. In particular, the user may tap to add items to the shopping list and/or swipe to remove items from the shopping list.

The list is ordered in step 350. This is automatic in this example, although may be user activated in another example. The ordering is according to location of the products in the store, using a location filed in the available products list uploaded data. The location may be one or more of: a coordinate; a direction from the current location of the end user; a direction from an entrance to the supermarket; a reference to an aisle; a reference to a shelf; a reference to a shop assistant; or a best (quickest) route within the supermarket as in this example.

An indication of that location is given to the user in the results list. The app indicates location in the updated list, for instance, by aisle.

In an alternative example, the list is ordered in other ways for example, by the time of entry of a given item into the desired list. The selected time in this example is displayed in the reordered list, although may not be displayed in other examples.

As the user navigates the store using the updated list, the app includes an option to update the list order in real time. It may be that the user has followed a path not indicated by the updated list, and the refreshed list order will indicate a new best path for progressing through the store. Or new items may have been added to the list in transit through the store, and again a refresh of list order (by selecting an option in the app say) will lead to a revised list with optimum transit. In one example where the user has followed a path not indicated by the updated list and has scanned an item out of order, the list updates to reflect that the item has been scanned, but does not update the order of the list. In this way, the original list order is maintained. Usefully, this can reduce the amount of processing required, making for quicker data handling, as it is not necessary to determine a new best path.

In one example, the shopper can hit the 'location update' button on the top right hand side of the screen at any time to view their list in order as a whole or before they enter the store. In one example, this step is automated so advantageously no user input is required.

The reordering is processed on the mobile device only. This may be automatic. The changes happening are in this example:
- When an item in the shopping list is scanned by the user, the item is moved to a checkout list.
- When an item not present in the shopping list is scanned by the user, the item is added to the shopping list.
- The user has a button which can reorder the product list by: a.) insertion date b.) best route within the supermarket. Other input methods are used in other examples—such as voice control, swiping etc.

Shopping Using the Updated List

At step 360, the user enters a product barcode onto the handheld device by scanning a bar code on the item to purchase. In other examples, other methods are used to enter the product identification such as with a separate scanner that uploads data to the mobile app, or by manual entry of a barcode say using a keypad on the mobile, or the voice recognition function, or by typing the name of the item, or any other suitable means.

The user may be alerted by the app when it is near a barcode on the list for scanning.

The product barcode in this example is an identification code for the product in the supermarket. In some embodiments the product barcode is a variable price barcode as described further below.

The product barcode is on the product; but in other examples the product barcode is near the location of the product.

At steps 380 and 370 the product barcode is crosschecked with the one or more products displayed to the user to determine if the product barcode matches one of the one or more products displayed to the user.

At step 380 the product barcode matches one of the one or more products displayed to the user. In this case, the matched product is removed from the one or more products displayed to the user. The scanned product is then added to a matched or "checkout list", displayed to the user in this example. In other examples, the checkout list is not available to view.

During shopping by the user then, products may be added, deleted or moved between either or both of the results "shopping" list displayed to the user and the matched "checkout" list displayed to the user. In other examples the checkout list is not displayed.

At step 370 the product barcode does not match one of the one or more products displayed to the user. In this case, the product associated with the barcode is added to the checkout list without removing any of the products from the products displayed to the user in the shopping list. In some examples, the user must manually override the system to do this. The user can do this by touching, tapping, swiping, or any other means of user inputting, to the mobile device. The user may be prompted by an alert on the mobile device to manually override the system.

Optionally, the user returns to step 360 after step 370 or 380 to repeat the steps 360 to 370 or 380. The result of repeating steps 360 to 370 or 380 is that a plurality of matched products is displayed to the user in the checkout list. Optionally, the user can easily amend the products displayed in the checkout list by making a suitable user input to the mobile device. For example, the user can change the quantity of a product or delete a product.

During shopping, the user may request a reorder of the shopping list according to any of the criteria specified with respect to step 350. In this example, if a user has taken a different path around the store to browse products say, the user can request a revised order of best route to take for the remaining shopping list. This step is activated by a selection in the app itself, in this example.

Checkout

When the user has scanned all the items desired (which may be less or more than those on the shopping list), the user at 390 signals the end of the method using the user interface of their mobile (although alternative means, such as verbal are used in other examples). In other examples, there is no signalling of the end of shopping.

This end signalling in this embodiment is equivalent to step 391 in which the user begins the payment process by entering a checkout code on the user input device. In other examples step 391 is separate or used alone. The checkout code is associated with a supermarket POS 171 of the supermarket. In some embodiments the checkout code is a barcode. In other embodiments the checkout code is a quick response (QR) code. In some embodiments the checkout code is scanned by the end user using the handheld device, or a code is entered on the device using a keypad, say.

At step 392 the user purchases the one or more matched products displayed to the user. Payment sequences for purchasing will now be described. In some examples, the method 300 for store shopping comprises at least one of the payment sequences which will now be described. The at least one payment sequence may be carried out on the same user device as the method 300. Advantageously, by integrating the at least one payment sequence with the method 300 for store shopping, a data efficient, fast and convenient method is provided for optimising an electronic shopping list, and ultimately purchasing one or more products, is provided.

Payment

Figure 4:
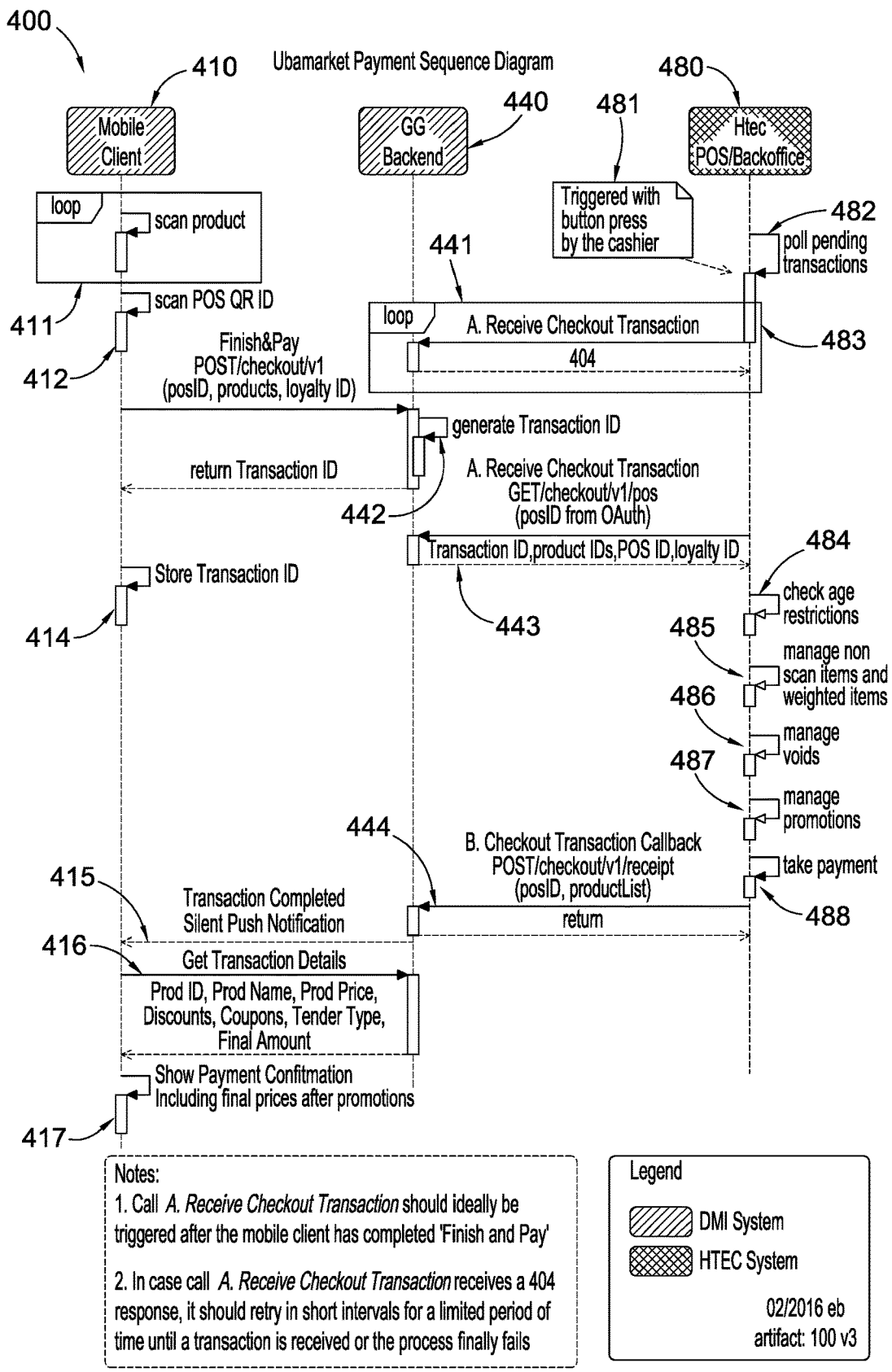
FIG. 4 is a schematic of a payment sequence for the store shopping method.

FIG. 4 shows a schematic of a payment sequence 400. The payment sequence 400 has a mobile client 400, a backend 440 and a supermarket POS and back office 480. The payment approach may be separate from, or part of the optimized shopping list method and apparatus.

In this example, the mobile client 400 is equivalent to the mobile application 120, the backend 440 is equivalent to the backend server 152. In another example, the backend 400 is equivalent to the backend 200. In this example, the supermarket POS and back office 480 are equivalent to the supermarket POS 171 and the supermarket back office 172 in the supermarket system 170; although they may be separate and/or different entities in other examples.

Each of the features of the payment sequence 400 will now be discussed in turn and in the order in which they occur in this example.

At 411 the user scans the barcode of the product during shopping. At 412 the user scans the QR code for a supermarket POS. The QR code is a unique identification code (ID) for the supermarket POS. In alternative examples the ID for the supermarket POS is not given as a QR code but is instead presented as a text code, or any other means of representing an ID.

At 413 a first message is sent from the mobile client 410 to the backend 440. The message contains information on one or more of the supermarket POS ID; the product or products that the end user has scanned; and the end user's loyalty scheme ID. It is at this point that information related to the checkout list is shared with the server 440. Later, as explained below, it will be shared with the POS. This flow can also be used to retrieve past purchases.

The first message is received at the backend 440. At 442 the backend 440 generates a transaction ID for the payment sequence transaction. The backend 440 sends the transaction ID to the mobile client 410 in a further message.

Meanwhile, at 481 a cashier of the supermarket POS triggers a poll 482 to begin to identify pending transactions. The cashier triggers the poll 482 to begin by pressing a button at the supermarket POS, or using any other means. If there are no pending payment transactions at the backend 440 then the supermarket POS and backoffice 480 receives a "404" response. If the supermarket POS and backoffice 480 receives a "404" response then it retries polling in short intervals for a limited period of time until a message detailing a pending transaction is received or the process fails. The process fails when no message detailing a pending transaction is received.

At 443 the supermarket POS and back office 480 receive a message back from the backend 440 in response to their polling. The message is a message which contains information on one or more of the supermarket POS ID; the product or products that the end user has scanned; and the end user's loyalty scheme ID. The message may be substantially similar to the first message, but additionally including the transaction ID.

Review of Purchases

In this example, the scanned products are reviewed as part of the purchase process, although this process does not take place in other examples. The review can be checking the suitability of the purchase with respect to certain criteria such as, for example, age of the user or store promotions.

At 484 the supermarket POS and back office 480 verify, for example, if there are age restrictions on any of the one or more scanned products. At 485 the supermarket POS and back office 480 manage products which cannot be scanned and items which need to be checked manually—perhaps weighed by the cashier. At 487 the supermarket POS and back office 480 manage promotions on the one or more scanned products. The sequences of 484 to 487 are to be carried out be a cashier. Some or all of the sequences of 484 to 487 may be carried out by other means in other examples, and may or may not be automated.

In this way, the POS can make modifications on the items being taken. Examples of modifications are:
Underage users cannot take alcoholic beverages. Those items are removed from the shopping list.
Promotions, such as 3 for 2, will alter the price of products taken.
Products with defects can be removed from the shopping list by the cashier.

After the modifications by the POS on the shopping list are applied, then the shopping list in the mobile device is replaced by the one sent by the POS.

At 488 the supermarket POS and back office 480 creates a final bill for the end user and takes payment for the amount of the bill. Payment may take place in a variety of ways.

The supermarket POS, at 444, and back office 480 send a message to the backend 440 with information on the payment transaction.

There is a silent push notification at 415 from the backend 440 to the mobile client 410. In response to the silent push notification 415, the mobile client 410 sends a message to the backend 440 requesting details of the payment transaction.

At 416 the backend 440 responds to the message requesting details of the payment transaction by sending a message. This message contains information on one or more of the IDs, names or prices for the product(s) purchased; any discounts applied in the payment transaction; any coupons applied in the payment transaction; the tender type; and the final payment amount.

The information retrieved from the POS system about items in the user's shopping list gets to the mobile device by being sent as a new package.

At 417 the mobile client 410 displays confirmation that the payment has been successful. The confirmation may be displayed on the screen of the handheld device. The confirmation may include the final prices paid for the products and the final payment amount after promotions.

After 417, the payment sequence ends. The confirmation may be stored locally on the handheld device; or not stored. The confirmation may additionally include information indicative of the user's original shopping list; the user's total spend; the user's total saving; the user's previous shopping list. The confirmation may additionally, or alternatively, be an e-receipt or alert.

A link library is typically used for sending to the backend server products available in store, collecting from the server the list of products the customer has scanned and picked up for purchase at the POS, and sending to the server a list of products that the customer has purchased in the completed transaction.

In-app Payment

Figure 5:
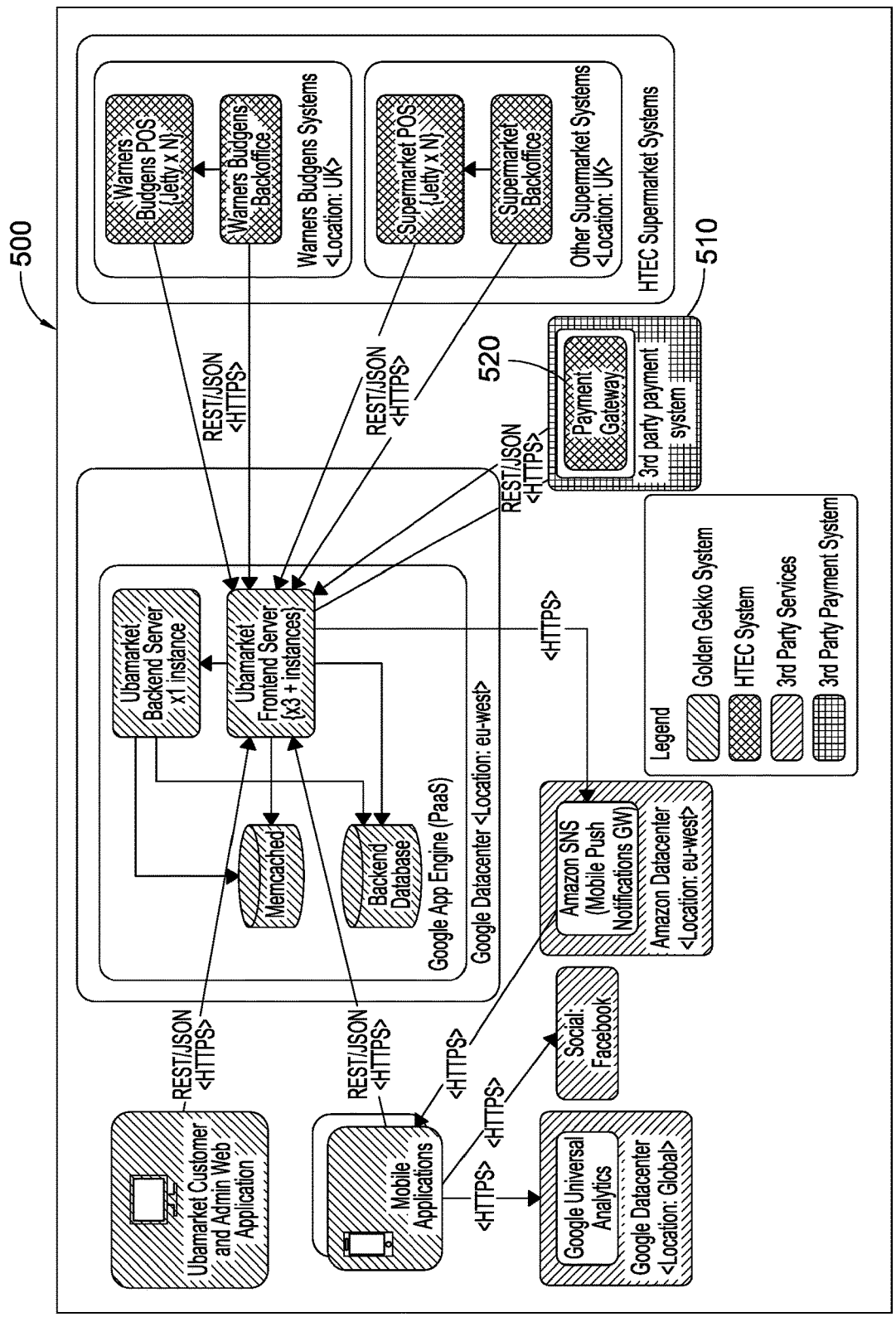
FIG. 5 is a system architecture according to another aspect of the present disclosure.

FIG. 5 shows a system architecture 500 which is an optional extension of system architecture 100 of FIG. 1. Like numerals are used for like elements.

System architecture 500 is an extension of system architecture 100 as it additionally comprises a third ("3$^{rd}$") party payment system 510. A 3rd party payment system is any system suitable for processing a financial transaction between two parties. In this case, the 3rd party payment system is used to process the purchase by a user of one or more products from the store. The user can purchase the one or more products by transferring an appropriate value of currency to the store in exchange for the products, via the 3rd party payment system. The currency is one of a number of currencies accepted by the store. At least a part of the currency may be loyalty points and/or online currency, such as bit coin. Examples of 3rd party payment systems include: Stripe; Braintree; Worldpay; and Adyen. The 3rd party payment system is communicably coupled, here wirelessly, with the frontend server 151 of the datacentre 140.

Advantageously, because the user can pay for their products via the 3rd party payment system 510, they do not need to use a checkout terminal in the store. Furthermore, the user can pay for their products at any physical location in the store, or indeed outside of the store. Accordingly, a streamlined, fast, simple and more highly automated approach to in store product payment is provided that works synergistically with the data handling described above.

The 3rd party payment system 510 comprises payment gateway 520. Payment gateway 520 authorises payments made by the user and facilitates payment transactions.

Figure 6:
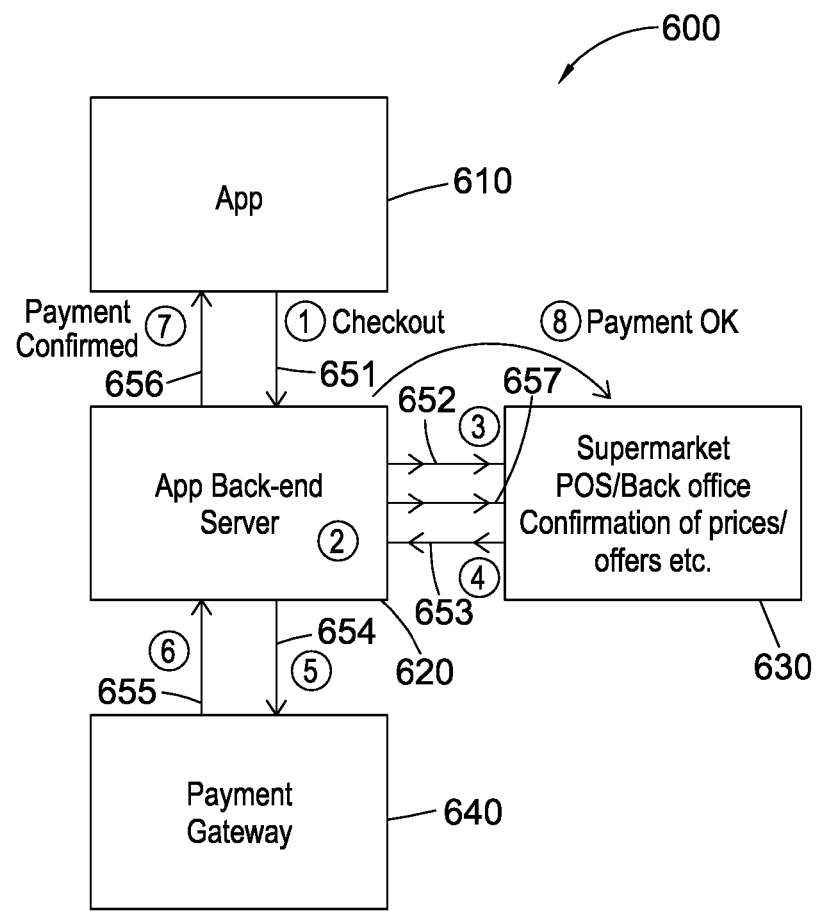
FIG. 6 is a schematic of another payment sequence for the store shopping method.

FIG. 6 shows a schematic of a payment sequence 600. The payment sequence 600 is executed using system architecture 500. The payment sequence 600 has steps carried out between an app 610; an app back-end server 620; a supermarket POS and back office 630; and a payment gateway 640.

In this example, the app 610 is equivalent to the mobile application 120; the app back-end server 620 is equivalent to the backend server 152; the supermarket POS and back office 630 is equivalent to the supermarket POS 171 and the supermarket back office 172 in the supermarket system 170; and the payment gateway 640 is equivalent to the payment gateway 520; although they may be separate and/or different entities in other examples.

Each of the features of the payment sequence 600 will now be discussed in turn in and in the order in which they occur in this example.

A user, having part or completely finished their shopping as described above; indicates on the app 610 that they wish to check out—that is, that they wish to pay for the products added to their checkout list. Once the user has indicated that they wish to check out, a transaction is generated and is sent at 651 to the app back-end server 620. The transaction contains information on the product or products in the checkout list, including their price, and information on the end user's loyalty scheme ID.

At 652, the transaction is sent from the app back-end server 620 to the supermarket POS and back office 630.

The supermarket POS and back office 630 checks whether or not the price of the product or products in the checkout list are correct and checks whether or not any discounts should be applied.

If the supermarket POS and back office 630 confirms that the price of the product or products are correct, at 653 a message is sent to the app back-end server 620 confirming that the price of the product or products are correct.

At 654, the app back-end server 620 sends the transaction to the payment gateway 640. The payment gateway 640 processes the transaction in a known way. If a user is a new user, the payment gateway 640 may send a message to the app 610 either directly, or via the app back-end server 620, requesting payment information. The payment information may be at least one of debit card details, credit card details, or loyalty scheme details.

At 655, the payment gateway 640 sends confirmation to the app-back end server 620 that the transaction has been completed and was successful.

At 656, the app-back end server 620 sends confirmation to the app 610 that the transaction has been completed and was successful. The app notifies or alerts the user of the successful completion of the transaction. This may be done via any medium, and specifically via the user device on which the app is running. For example, the user device may vibrate and/or show a screen alert or notification when the confirmation that the transaction has been completed and was successful is received.

At 657, the app-back end server 620 sends confirmation to the app 610 that the transaction has been completed and was successful and therefore that payment for the product or products has been made.

Where the payment monies go can be advantageously determined by each individual store group.

As described above, advantageously, in this arrangement the user can pay for their products without needing to use a checkout terminal in the store. Usefully, this improves the efficiency of the payment process, minimising resources in the user's device and the store's equipment; as the user does not need to queue for a checkout terminal. This approach is also more accurate.

Variable Barcodes

As described above, in one example barcodes on products are used to identify the products and as part of the shopping/purchase method.

Most retail barcodes are simple identification codes, each uniquely identifying a product. Some types of barcode identify the price of the product as well as the product itself. Advantageously, this is to allow the product to be sold in varying weights, either in pre-packaged form or in a customer self-weigh scenario.

The inclusion of the price within the barcode allows a store electronic POS, EPOS, system to determine both the product and its price from the barcode.

Some of the types of variable weight barcode that may exist include:

Branded variable measure items—barcodes produced by a manufacturer for use on pre-packaged and pre-weighed items in stores nationwide.

UK in-store variable measure items—barcodes produced by a retailer or retail group within a closed environment (i.e. solely within stores for that group) for use on pre-packaged and pre-weighed items in stores.

UK in-store variable measure items (self-weigh)—barcodes produced by a retailer or retail group within a closed environment (i.e. solely within stores for that group) for use on customer self-pack and self-weigh items in store using a customer operated scale that prints the barcode label.

These will be described in more detail in the following sections.

In this example, although not always; the first few digits of the barcode identifies the product. The remaining digits will include the price and other digits derived from the price (a price verifier code) and a check digit (derived from all other digits in the barcode). The retail systems (EPOS and Back Office) should store the barcode in its product database such that the product can be identified, but with the price, price verifier and check digit all set to zero.

When a variable price barcode is scanned, the POS recognises that the barcode is a variable price barcode and determines the price from the correct digits. To identify the product, the EPOS would replace the price, price verifier and check digit in the barcode with zeros and search the product database for the resulting barcode.

Branded variable measure items: these are 13 digit barcodes starting with "20" to "28".

Digits 1 to 7 (i.e. 20XXXXX) identify the product, digit 8 is a price verifier digit which is calculated from the price by an algorithm, digits 9 to 12 are the price in pence (e.g. 0255 is £2.55), digit 13 is a check digit which is calculated from digits 1 to 12 using an algorithm.

UK in-store variable measure items (pre-packaged an self-weight): these are 12 digit barcodes starting with "2" (some systems would store them as 13 digit barcodes starting with "02", but some system does not store the leading zero on any barcodes).

Digits 1 to 6 (i.e. 2XXXXX) identify the product, digit 7 is a price verifier digit which is calculated from the price by an algorithm, digits 8 to 11 are the price in pence (e.g. 0255 is £2.55), digit 12 is a check digit which is calculated from digits 1 to 11 using an algorithm.

UK in-store variable measure items (self-weigh): these are the same as the UK In-Store Variable Measure barcodes described above. The only difference is that the barcode is produced on a scale and label printer that the customer operates in store. The customer selects the item from an on screen menu, places the item on the scale and the printer prints a label. The customer puts the label on the bag for scanning at the EPOS system.

These are 12 digit barcodes starting with "2" (some systems would store them as 13 digit barcodes starting with "02", but some system does not store the leading zero on any barcodes).

Digits 1 to 4 (i.e. 2XXX) identify the product, digits 5 to 6 are price verifier digits which are calculated from the price by an algorithm, digits 7 to 11 are the price in pence (e.g. 0255 is £2.55), Digit 12 is a check digit which is calculated from digits 1 to 11 using an algorithm.

When storing products according to one example described here, (either from the POS interface product update feed, or the input from some data feed), any 13 digit barcodes starting with "02" should have the leading zero stripped away to create a 12 digit barcode starting with "2". This is to make the system consistent with the way that barcodes are processed in, for example, some known POS system.

According to the example of shopping described above, the mobile app downloads a local copy of the store product database for use when scanning products within the store.

When a barcode is scanned the mobile app checks to see if the barcode fits one of the variable measure formats and applies rules as appropriate.

The first step is to check if the barcode is 13 digits starting with "02". If so, then the leading zero is stripped to create a 12 digit barcode starting with "2".

The next step is to process the barcode as follows:

If the barcode is 13 digits in length starting with digits ranging from "21" to "28", or 12 digits in length starting with "2", then the following is carried out:

barLength=length of barcode.

Use digits (barLength—4) to (barLength—1) to determine the price (i.e. digits 9 to 12 for 13 digits barcodes, digits 8 to 11 for 12 digit barcodes).

Store the barcode as two separate variables, fullBarcode and lookupBarcode.

Replace the last 6 digits of lookupBarcode with zeros.

Use lookupBarcode to search the local product database to find the item.

Use fullBarcode when storing the barcode line in the purchase list which is sent to the Ubamarket server, since the POS will need the full barcode to determine the price from its own database.

If the barcode does not start with "21" to "29" or "2", then process it normally, i.e. use the barcode "as is" to search the local product database to determine the description and price, and when storing within the purchase list.

In the above example, when the server receives a purchase list (checkout list) from the mobile app, it can perform a product lookup for each barcode again.

If it does perform such a product lookup, then the same logic as described in the section above should be followed to create a lookupBarcode with which to perform the search.

When the purchases are sent to the POS, the barcode should be the full barcode as sent by the mobile app, i.e. with the price included, so that the POS can perform its own look up.

When the POS sends the receipt summary back to the server, the POS will send the barcode with the last 6 digits as zeros. This will then be consistent with the barcodes in the product database, so advantageously this process within the server should not need to be changed.

Alerting Based on a Trigger Variable

In one example, the user of the app has the opportunity to indicate a trigger variable indicative of a particular allergen, say. The user of the app is alerted if the trigger variable is associated with any of the products in their shopping list, or with any of the products that they subsequently scan.

Each of the trigger variables from which the user may choose is associated with a field in the backend database 154. Consequently, if the ingredients, say, for a particular product are updated, a field in the backend database 154 for that product will be updated and an updated version of the database sent to the user equipment running the app.

When the user creates a new shopping list in the app, the database is queried to check whether any of the fields associated with the available products in the store which match the products on the shopping list have the trigger variable.

If any of the fields associated with the available products which match the products on the shopping list do have the trigger variable then the user of the app is alerted.

Furthermore, if the user scans a barcode for a product which is not on the shopping list, the database is queried to check whether any of the fields associated with that product have the trigger variable. Again, if any of the fields associated with that product do have the trigger variable, then the user of the app is alerted.

For some products, the product barcode may include a digit which is indicative of the trigger variable. In this case, when the user scans the barcode for the product, the app will recognise that the product's barcode has a digit indicative of the trigger variable and will alert the user.

Intelligent Shopping List

In one example, when a name of a product on the user list of products is not recognised by the app and/or is not found in either or both of the local copy of the backend database on the mobile or in the backend database on the server, the product is added to the previously described revised list anyway, and the app associates a subsequently scanned product with the product name. In this way the app can be considered as intelligent and demonstrates learning capability.

The invention claimed is:

1. A method of optimising an electronic shopping list, comprising:

receiving, by at least one processor of a portable user equipment, a user list of products;

downloading, by the at least one processor, from a database located remotely from the portable user equipment, to a local memory of the portable user equipment, a copy of a store list of available products that is stored on the database, each available product characterized by at least one variable according to which an order of products on the user list is revisable;

using, by the at least one processor, and without a connection to the database, the received user list and the downloaded copy of the store list to compile a revised list, including the at least one product, from the user list and the downloaded copy of the store list, wherein compiling the revised list comprises (i) associating each product from the user list with a corresponding one or more of the available products from the downloaded copy of the store list when such one or more corresponding available products exist on the copy of the store list and (ii) arranging an order of the associated corresponding products in the revised list depending at least upon the at least one variable;

causing, by the at least one processor, the revised list to be displayed via a user interface of the user equipment;

after compiling the revised list, receiving, by the at least one processor, and via a bar code scanner of the portable user equipment, a scan of a bar code of one or more products from the revised list; and when the product has had a bar code scanned, removing, by the at least one processor, the product from the revised list.

2. The method of claim 1, wherein the at least one variable includes one or more of:
   (i) a location of the product in the store, wherein, when the at least one variable includes a location of the product, the order is the shortest route around the store to reach all the products on the revised list and/or the most efficient route around the store to reach all the products on the revised list; and
   (ii) a time at which the each product is added to the user list.

3. The method of claim 1, wherein associating each product from the user list with a corresponding one or more of the available products comprises associating at least one of the products from the user list with more than one available product, and wherein compiling the revised list further comprises:
   receiving an input indicative of user selection of one or more of the more than one available product to be associated with the at least one of the products; and
   in response to receiving the input, associating the selected one or more of the more than one available product with the at least one of the products.

4. The method of claim 1, further comprising:
   after arranging the order of the revised list depending at least upon the at least one variable, detecting, by the at least one processor, an update to the at least one variable; and
   in response to detecting the update to the at least one variable, updating, by the at least one processor, the order of the revised list dependent upon the updated at least one variable.

5. The method of claim 1, further comprising:
   making, by the at least one processor, a determination of one or more of: (i) that a bar code of a particular product in the revised list has not been scanned within a predefined time period or (ii) that a scanned bar code for a particular product includes a trigger variable; and
   in response to the determining, outputting, by the at least one processor, via an output device of the portable user equipment, an audio and/or visual alert indicating the determination that has been made.

6. The method of claim 1, further comprising compiling, by the at least one processor, a checkout list of products whose bar codes have been scanned.

7. The method of claim 6, further comprising:
   receiving, by the at least one processor, an input indicative of a scan of a bar code at a point of sale; and
   transmitting, by the at least one processor, to a server, the information relating to the checkout list and information related to the bar code.

8. The method of claim 7, further comprising:
   retrieving, by the at least one processor, information from the server related to the checkout list; and
   utilising, by the at least one processor, the retrieved information for payment by the user of products on the checkout list.

9. The method of claim 8, further comprising revising, by the at least one processor, the products included in the checkout list by comparing the products to one or more predetermined criteria.

10. The method of claim 9, wherein revising the products comprises checking each product against an age restriction for each product.

11. A portable user equipment to optimize an electronic shopping list, the portable user equipment comprising:
   a user interface;
   a bar code scanner;
   at least one processor;
   a computer readable storage system having stored thereon instructions that, when executed by the at least one processor, cause the at least one processor to perform operations comprising:
      receiving a user list of products;
      downloading, from a database located remotely from the portable user equipment, to a local memory of the portable user equipment, a copy of a store list of available products that is stored on the database, each available product characterized by at least one variable according to which an order of products on the user list is revisable;
      determining that a name of at least one product on the user list does not correspond to an available product on the copy of the store list;
      using, without a connection to the database, the received user list and the downloaded copy of the store list to compile a revised list, including the at least one product, from the user list and the downloaded copy of the store list, wherein compiling the revised list comprises (i) associating each product from the user list with a corresponding one or more of the available products from the downloaded copy of the store list when such one or more corresponding available products exist on the copy of the store list and (ii) arranging an order of the associated corresponding products in the revised list depending at least upon the at least one variable;
      causing the revised list to be displayed via the user interface of the portable user equipment;
      after compiling the revised list, receiving, via the bar code scanner, a scan of a bar code of one or more products from the revised list; and
      when the product has had a bar code scanned, removing the product from the revised list.

12. The portable user equipment of claim 11, wherein the at least one variable includes one or more of:
   (i) a location of the product in the store, wherein, when the at least one variable includes a location of the product, the order is the shortest route around the store to reach all the products on the revised list and/or the most efficient route around the store to reach all the products on the revised list; or
   (ii) a time at which the each product is added to the user list.

13. The portable user equipment of claim 11, wherein associating each product from the user list with a corresponding one or more of the available products comprises associating at least one of the products from the user list with more than one available product, and wherein the operations for compiling the revised list further comprise:
   receiving an input indicative of user selection, via a means for selecting, of one or more of the more than one available product to be associated with the at least one of the products; and
   in response to receiving the input, associating the selected one or more of the more than one available product with the at least one of the products.

14. The portable user equipment of claim 11, the operations further comprising:
   after arranging the order of the revised list depending at least upon the at least one variable, detecting an update to the at least one variable; and
   in response to detecting the update to the at least one variable, updating the order of the revised list dependent upon the updated at least one variable.

15. The portable user equipment of claim 11, wherein the operations further comprise:
   compiling a checkout list of products whose bar codes have been scanned.

16. The portable user equipment of claim 11, wherein the operations further comprise:
   making a determination that a bar code of a particular product in the revised list has not been scanned within a predefined time period; and
   in response to the determining, outputting, via an output device of the portable user equipment, an audio and/or visual alert indicating the determination that has been made.

17. The portable user equipment of claim 11, wherein the operations further comprise:
   receiving, via the bar code scanner, an input indicative of a scan of a bar code at a point of sale; and
   transmitting to a server the information relating to the checkout list and information related to the bar code.

18. The portable user equipment of claim 17, wherein the operations further comprise revising the products included in the checkout list by comparing the products to one or more predetermined criteria.

19. The portable user equipment of claim 11, wherein the operations further comprise revising the products comprises checking each product against an age restriction for each product.

20. The portable user equipment of claim 11, wherein the operations further comprise:
   making a determination that a scanned bar code for a particular product includes a trigger variable; and
   in response to the determining, outputting, via an output device of the portable user equipment, an audio and/or visual alert indicating the determination that has been made.

* * * * *